(12) United States Patent
Hayles et al.

(10) Patent No.: US 6,243,738 B1
(45) Date of Patent: Jun. 5, 2001

(54) DATA ACQUISITION SYSTEM WHICH INCLUDES REMOTE ACCESS TO DATA ACQUISITION DEVICES

(75) Inventors: Tim Hayles, Austin, TX (US); Vivek G. Gupta, Portland, OR (US)

(73) Assignee: National Instruments Corporation, Austin, TX (US)

( * ) Notice: Subject to any disclaimer, the term of this patent is extended or adjusted under 35 U.S.C. 154(b) by 0 days.

(21) Appl. No.: 09/055,589

(22) Filed: Apr. 6, 1998

(51) Int. Cl.[7] .......................... G06F 15/16; H04L 12/46; G01V 1/28
(52) U.S. Cl. ......................... 709/203; 370/312; 702/16; 709/201; 709/202
(58) Field of Search ............................. 370/312; 702/16; 709/201–211, 304

(56) References Cited

U.S. PATENT DOCUMENTS

| | | | |
|---|---|---|---|
| 5,668,803 | * | 9/1997 | Tymes et al. ........................ 370/312 |
| 5,671,414 | * | 9/1997 | Nicolet ................................ 709/304 |
| 5,828,840 | * | 10/1998 | Cowan et al. ....................... 709/203 |
| 5,867,688 | * | 2/1999 | Simmon et al. ..................... 709/208 |
| 6,041,283 | * | 3/2000 | Sigmar et al. ........................ 702/16 |

OTHER PUBLICATIONS

Ethernet GPIB Controller for PCs and Workstations, National Instruments Instrumentation Reference and Catalogue, 1997, pp 4–71 through 4–74, ©1996.

* cited by examiner

*Primary Examiner*—Ayaz Sheikh
*Assistant Examiner*—Tammy Tak Lee
(74) *Attorney, Agent, or Firm*—Conley, Rose & Tayon PC; Jeffrey C. Hood

(57) ABSTRACT

A remote device access (RDA) feature for enabling access and control of remote devices in a data acquisition (DAQ) system. The data acquisition system comprises at least one client computer system executing a client DAQ application. The data acquisition system also comprises one or more server computer systems coupled to the client computer system through a network, wherein each server computer includes a data acquisition device which is controllable by the client DAQ application. The RDA method comprises the client DAQ application making a call to access the remote DAQ device in the server computer. In response to a determination that the call is intended for a remote DAQ device (the identical call could be intended for a local DAQ device), the call is then packaged into one or more packets and transferred to the server computer. The packets are preferably transferred using a remote procedure call (RPC). The server computer receives the one or more packets and unpackages the one or more packets to produce the call. The call is then provided to DAQ driver software executing in the server computer. The DAQ driver software executing in the server computer executes the call, i.e., performs a DAQ function using the DAQ device in response to the call, and generates result data. The result data is then transferred to the client computer, and the client application receives the result data.

49 Claims, 11 Drawing Sheets

RDA Client Computer

RDA Server Computer

RDA Client / Server Operation

DATA ACQUISITION SYSTEM WHICH INCLUDES REMOTE ACCESS TO DATA ACQUISITION DEVICES

RESERVATION OF COPYRIGHT

A portion of the disclosure of this patent document contains material to which a claim of copyright protection is made. The copyright owner has no objection to the facsimile reproduction by anyone of the patent document or the patent disclosure as it appears in the Patent and Trademark Office patent file or records, but reserves all other rights whatsoever.

FIELD OF THE INVENTION

The present invention relates to data acquisition (DAQ) systems, and particularly to a remote device access (RDA) feature which enables software programs executing on a computer to access and control remote data acquisition devices coupled through a network.

DESCRIPTION OF THE RELATED ART

Scientists and engineers often use DAQ systems to perform a variety of functions, including laboratory research, process monitoring and control, data logging, analytical chemistry, test and analysis of physical phenomena, and control of mechanical or electrical machinery, to name a few examples.

A typical DAQ system comprises a computer system with DAQ hardware, wherein the DAQ hardware is typically plugged into one of the I/O slots of the computer system. A DAQ system also typically includes transducers and other detecting means for providing "field" electrical signals representing a process, physical phenomena, equipment being monitored or measured, etc. The field signals are provided to the DAQ hardware. In another common DAQ system configuration, the DAQ hardware is coupled to the computer system via other means such as through a VXI (VME extensions for Instrumentation) bus, a GPIB (General Purpose Interface Bus), a serial port, or parallel port of the computer system. Optionally, the DAQ system includes signal conditioning modules which receive the field signals and condition the signals to be acquired.

The DAQ hardware is configured and controlled by DAQ software executing on the computer system. The DAQ software for configuring and controlling the DAQ system typically comprises two portions: the device interface or driver level software and the application software, or the application. The driver level software serves to interface the DAQ hardware to the application. The driver level software is typically supplied by the manufacturer of the DAQ hardware or by some other third party software vendor. An example of DAQ driver level software is NI-DAQ from National Instruments Corporation. The application or client is typically developed by the user of the DAQ system and is tailored to the particular function which the user intends the DAQ system to perform. The DAQ hardware manufacturer or third party software vendor sometimes supplies the application software for certain applications which are common, generic or straightforward.

In many instances it is desirable to enable a user executing a DAQ application program on a first computer to be able to access or control a DAQ device coupled to a second computer. Therefore, an improved system and method is desired for enabling DAQ users to more easily operate a distributed DAQ system.

SUMMARY OF THE INVENTION

The present invention comprises a remote device access (RDA) feature for enabling access and control of remote devices in a data acquisition (DAQ) system. The remote access is preferably identical to the way local devices are accessed and controlled. In other words, a client DAQ application is written the same way whether the devices it is accessing and controlling are local to the client or are remote.

Broadly speaking, the data acquisition system comprises at least one client computer system executing a client DAQ application. The data acquisition system also comprises one or more server computer systems coupled to the client computer system through a network, wherein each server computer includes a data acquisition device which is controllable by the client DAQ application.

The RDA method comprises the client DAQ application making a call to access the remote DAQ device in the server computer. In the preferred embodiment, the call includes a device number which indicates a remote device. Client DAQ driver software executing in the client computer receives the call and examines the device number to determine that the DAQ device is a remote device. In response to a determination that the call is intended for a remote DAQ device, the call is then packaged into one or more packets and transferred through the network to the server computer. The packets are preferably transferred using a remote procedure call (RPC).

The server computer receives the one or more packets and unpackages the one or more packets to produce the call. The call is then provided to DAQ driver software executing in the server computer. The DAQ driver software executing in the server computer executes the call, i.e., performs a DAQ function using the DAQ device in response to the call, and generates result data. The result data is then transferred through the network to the client computer, and the client application receives the result data.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Incorporation by Reference U.S. patent application Ser. No. 08/756,401 titled "DAQ Configuration System and Method for Configuring Channels in a Data Acquisition Device" filed Nov. 27, 1996, whose inventors are Deborah E. Bryant and Audrey F. Harvey, is hereby incorporated by reference as though fully and completely set forth herein.

Figure 1:
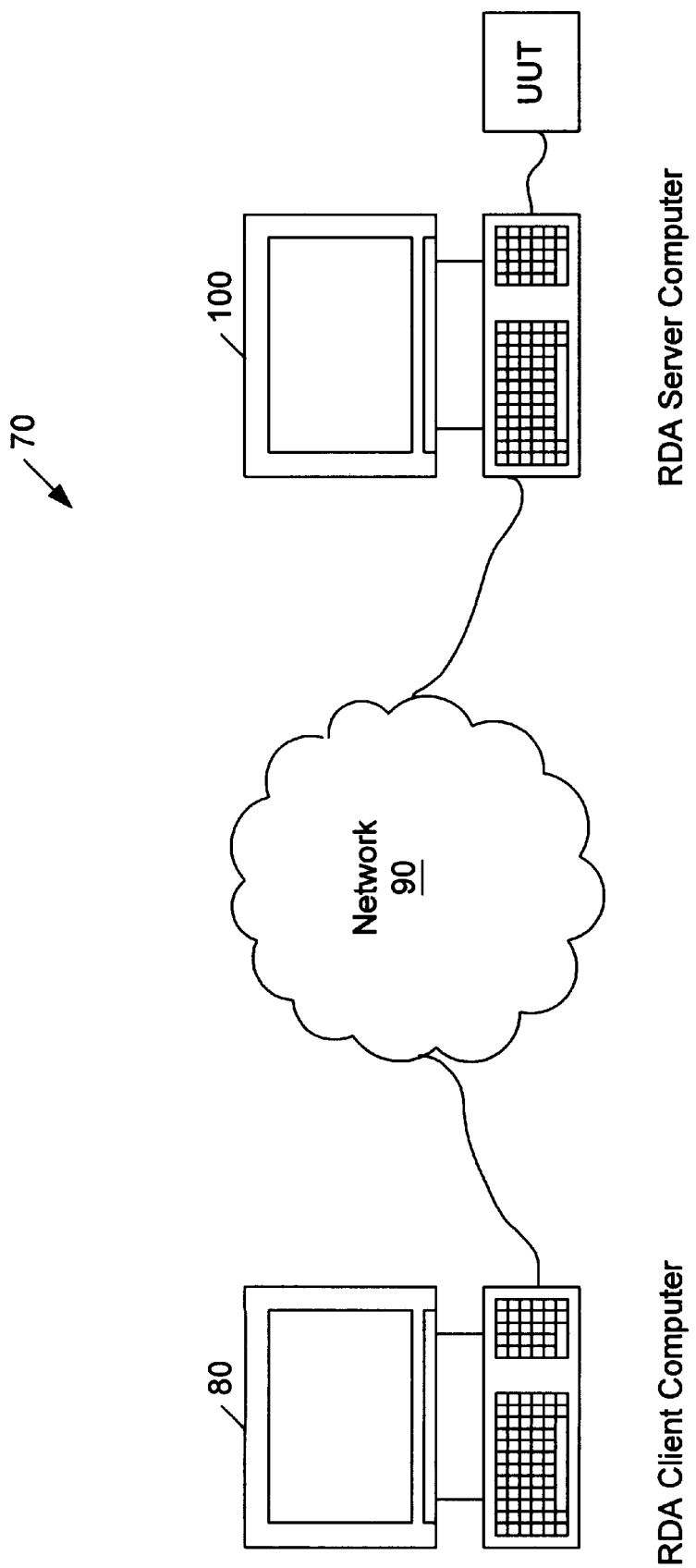
FIG. 1 illustrates a distributed DAQ system according to the present invention, including a client computer and a server computer, wherein the server computer includes a DAQ device which is controlled by the client computer.

FIG. 1—Distributed DAQ System

FIG. 1 illustrates a distributed data acquisition (DAQ) system 70 according to one embodiment of the present invention. As shown, the distributed DAQ system 70 comprises a remote device access (RDA) client computer 80 which is coupled through a network 90 to an RDA server computer 100. The network 90 may comprise any of various types of networks including, but not limited to, local area networks such as Ethernet networks or Token Ring networks, as well as wide area networks, including the Internet, among others. Also, the computers 80 and 100 may comprise any of various types of computers, as desired.

The RDA server computer 100 may be any of various types of systems, including a general purpose computer including one or more installed or external DAQ devices, a VXI chassis including one or more VXI boards, a PXI (PCI extensions for instrumentation) chassis, as well as others. In a similar manner, the RDA client computer 80 may be any of various types of systems, as desired.

The RDA client computer 80 stores application software, referred to as a client DAQ application, as well as DAQ driver software, which is executable to enable the RDA client computer 80 to access or control a DAQ device which is coupled to or comprised in the RDA server computer 100. The RDA server computer 100 includes one or more data acquisition (DAQ) devices which are controlled by the client DAQ application executing on the RDA client computer 80. The RDA server computer 100 interfaces to a unit under test (UUT) or process for which data acquisition/generation is desired.

The RDA client computer 80 may also include one or more local DAQ devices which are controlled by the client DAQ application comprised in the RDA client computer 80. Thus, the client DAQ application comprised in the RDA client computer 80 may actually control one or more local DAQ devices comprised in or coupled to the RDA client computer 80, as well as control one or more DAQ devices coupled to one or more RDA server computers 100. As discussed further below, the RDA client computer 80 executes the DAQ driver software to preferably enable remote access of DAQ devices according to the present invention. The RDA server computer 100 preferably also includes DAQ driver software for enabling remote access by the RDA client computer 80 to one or more DAQ devices coupled to the RDA server computer I 00.

Therefore, according to the preferred embodiment of the invention, application software executing on the RDA client computer 80 is executable to use, access or control DAQ devices connected to other computers on the network 90.

Each of the client and server computers 80 and 100 preferably includes a memory media, such as an installation media, e.g., floppy disk(s) 110, or a CD-ROM, on which computer programs according to the present invention are stored. The software programs of the present invention are also stored in the system memory and/or non-volatile memory of the respective computer, or in a memory of another computer, and executed by the CPU. The CPU executing code and data from the memory thus comprises a means for configuring and controlling one or more remote the DAQ device 104 to acquire/generate data from/to the field signals according to the steps described below. In the present disclosure, the terms "memory" or "memory media" are intended to include various types of memory, including installation media such as a CD-ROM, floppy disks 110, or tape drive disks, computer system memory such as DRAM, SRAM, etc., and nonvolatile memory such as a hard drive or optical storage. It is also noted that the memory may be located in the computer which executes the program or may be located in a different computer, as desired.

In the preferred embodiment, existing application programs require no modifications to use this remote device access feature. In other words, access to remote devices is transparent to the application program. According to the present invention, the application software executing on the RDA client computer 80 is executable to control DAQ devices coupled to the RDA server computer 100 in the same manner, and at the same functionality, as if the DAQ device were coupled locally to the RDA client computer 80. Stated another way, anything the application software can do assuming the DAQ device was coupled locally to the RDA client computer 80, the application program can also perform these functions when the DAQ device is coupled to a computer elsewhere on the network, e.g., RDA server computer 100, using the RDA feature of the present invention.

For example, the application software executing on the RDA client computer 80 can take snapshots of data remotely and analyze and/or display the data locally on the RDA client computer 80. Further, the application software can collect data from multiple remote RDA server computers 100 for analysis and display on the single local RDA client computer 80. Further, the application software can cause the RDA client computer 80 to transfer analog and/or digital data to the RDA server computer or remote computer 100 for purposes of remote control.

In general, the maximum transfer rates across the network using the RDA system and method of the present invention depends on the speed of and amount of traffic on the network 90 as well as the speed of the computers 80 and 100 used. For example, in one configuration, the RDA client computer 80 executed a continuous acquisition and chart software application, preferably the LabVIEW Cont Acq&Chart (Buffered).vi, at 100,000 scans a second, scanning a single channel.

Figure 1A:
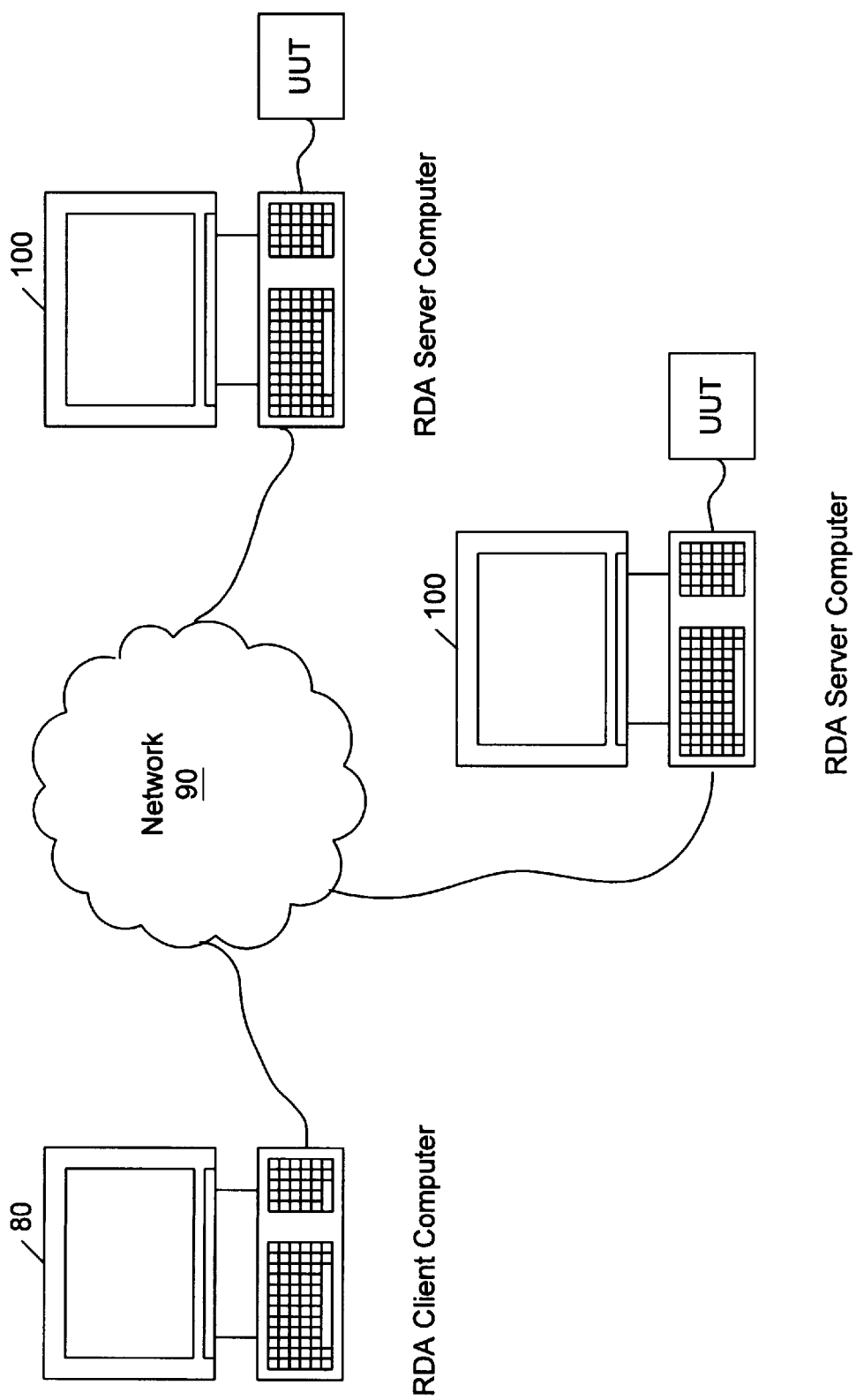
FIG. 1A illustrates a distributed DAQ system including at least one client computer accessing devices in two or more server computers.

FIG. 1A illustrates an alternate embodiment, wherein a single RDA client computer 80 can access remote DAQ devices in several different, i.e., two or more, RDA server computers 100. Thus, the present invention enables the application software executing on the RDA client computer 80 to monitor conditions or control DAQ hardware on multiple RDA server computers 100. A single RDA client computer can thus access remote devices in several RDA servers, enabling a user to monitor conditions at many places from a single computer. In addition, as mentioned above, the RDA client computer 80 can also use local DAQ devices which are coupled directly to the client computer 80.

Figure 1B:
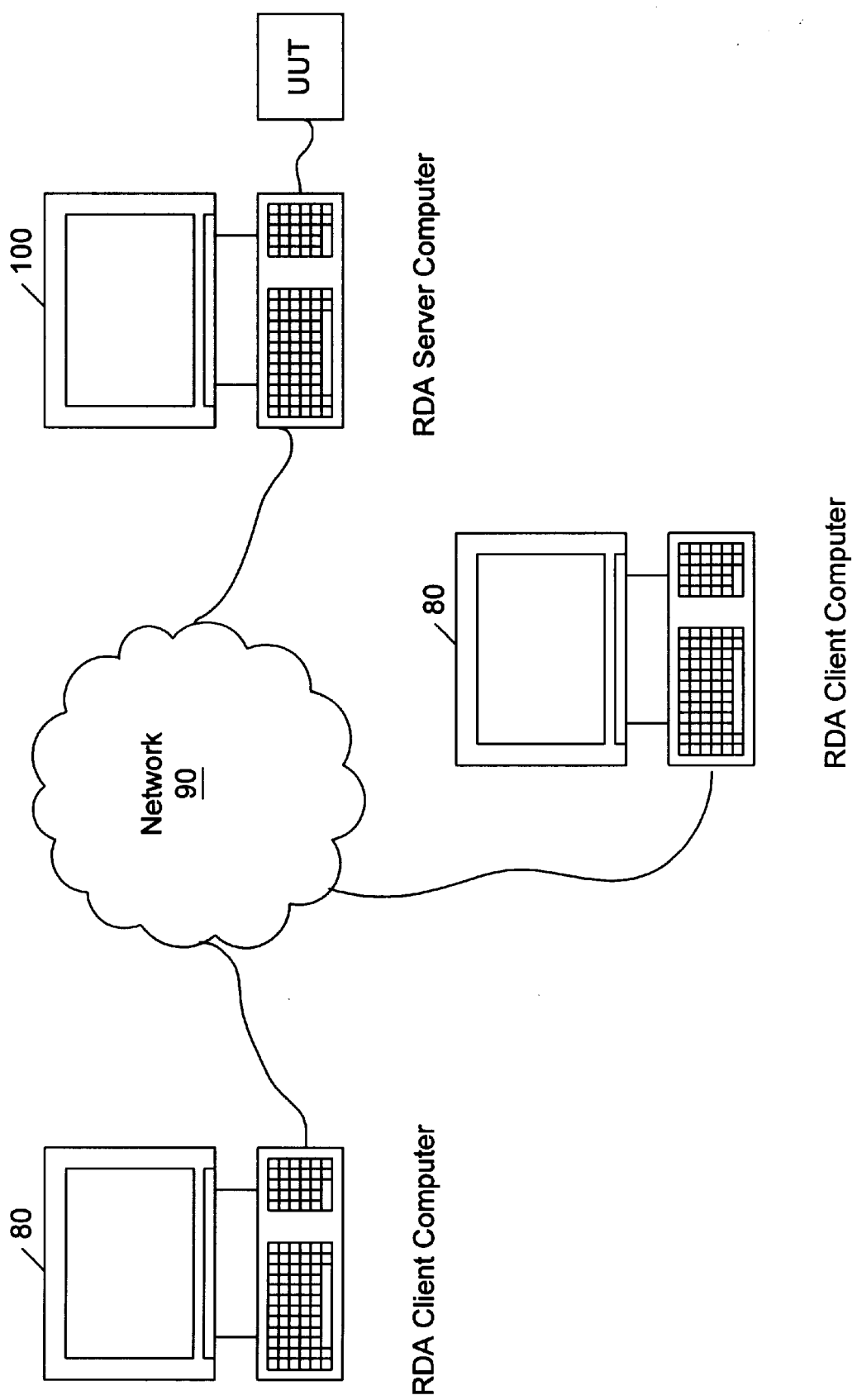
FIG. 1B illustrates a distributed DAQ system including two or more client computers accessing devices in at least on server computer.

FIG. 1B illustrates an embodiment wherein a remote DAQ device comprised in an RDA server computer 100 is used by two or more RDA client computers 80. It is noted that, when multiple client computers 80 access DAQ hardware in a single RDA server computer 100, certain precautions must be taken to prevent the collision of multiple client accesses. For example, assume that client A configures AI channel 3 in group 0 followed by client B configuring AI channel 5 on the same remote device and also using group 0. In this case, the readings taken by client A will be from channel 5 and not channel 3, since both clients will be passing the same taskID to the server. If both clients are reading from the same channel using immediate IO, then the I/O will operate properly. However, multiple access collisions can occur on buffered I/O because of its asynchronous nature. If client B calls AI Group Config on the remote device after client A has call AI Control to start its acquisition, client A's acquisition will be halted.

Referring again to FIG. 1B, remote DAQ devices can also be daisy chained across computers. This occurs when a computer is configured both as a client computer and a server computer. For example, assume that computer C is configured as an RDA server and includes a DAQ device. Computer B is an RDA client of computer C and assigns local device number 10 to the DAQ device in computer C. Now assume that computer B is also configured as an RDA server. Now assume another computer, referred to as computer A, is configured as a client computer and connects to computer B. Assume that computer A sees device 10 on computer B and assigns local device number 11 to device 10. Now, when Acquire N Scans is run on computer A using device 11, the calls are sent to computer B using its local device number of 10. Computer B then sends the calls to computer C, where the data is actually acquired. The data is acquired by computer C and then sent back to computer B, which sends it back to computer A for display.

FIG. 2—DAQ System

Figure 2:
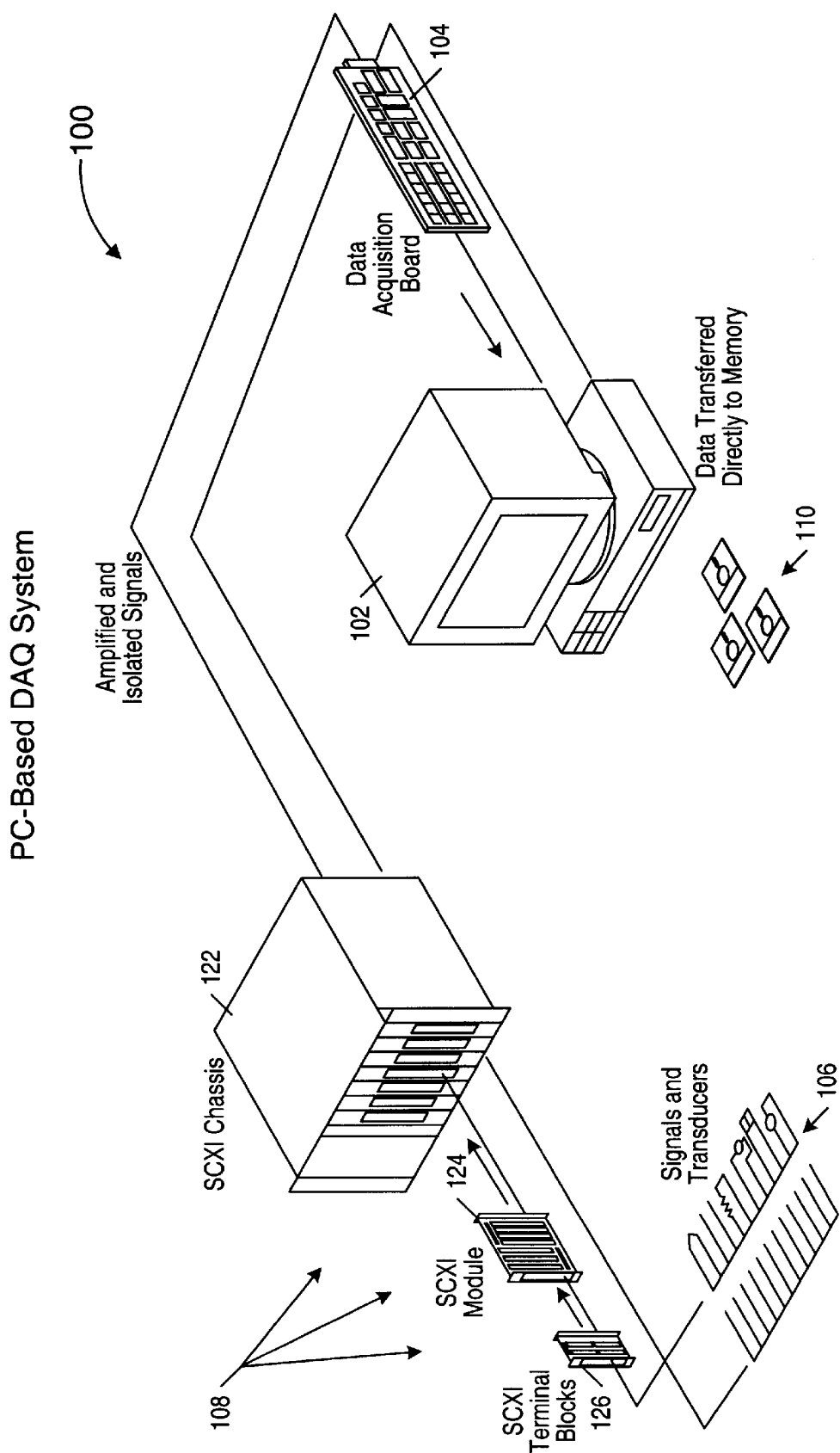
FIG. 2 illustrates a computer system including one or more DAQ devices.

FIG. 2 shows an illustrative RDA server computer 100 according to one embodiment of the present invention. FIG. 2 illustrates a PC based data acquisition system 100, i.e., illustrates one example of an RDA server computer 100 according to the preferred embodiment of the invention. As noted above, the RDA server computer 100 may take various other forms such as a VXI chassis, PXI chassis, or others. Further, the PC based DAQ system 100 in FIG. 2 may also represent an example of the RDA client computer 80, wherein the RDA client computer 80 includes one or more local DAQ devices.

The system 100 comprises a computer 102, a DAQ device or board 104 coupled to the computer 102. The DAQ system 100 may includes transducers 106 or other detecting means which provide field electrical signals to the DAQ device 104, optionally through signal conditioning circuitry 108. The computer 102 includes various standard components, including at least one central processing unit (CPU), non-volatile memory such as a hard drive, system memory, one or more buses, and a power supply.

In one embodiment, the computer 102 comprises input/output (I/O) slots into which the DAQ device 104 is coupled. In another embodiment, the computer 102 comprises a VXI (VME Extensions for Instrumentation) chassis and bus, a GPIB (General Purpose Interface Bus), a serial port or parallel port by which the DAQ device 104 is coupled to the computer 102. Examples of computer 102 are IBM-compatible personal computers.

In one embodiment, the transducers 106 are coupled directly to the DAQ device 104. In another embodiment, the signals received by the transducers 106 are conditioned by the signal conditioning circuitry 108 for presentation to the DAQ device 104 as shown. An example of signal conditioning circuitry 108 is Signal Conditioning Extensions for Instrumentation (SCXI) circuitry. SCXI is an open architecture, multi-channel signal conditioning front-end system for DAQ devices. SCXI comprises an external chassis 122 housing signal conditioning modules 124 and optionally terminal blocks 126 for amplifying, multiplexing, and isolating field signals. The signal conditioning modules advantageously reduce the introduction of noise into the signals transmitted to the DAQ device 104. The term "data acquisition" used in this specification is intended to encompass data generation as well as data acquisition, particularly as applied to instrumentation and process control systems.

The transducers 106 and other detecting means provide the field signals representing a process, physical phenomena, equipment being monitored or measured, etc. to the DAQ device 104. Examples of the transducers 106 are strain gauges, thermocouples, thermistors, photoconductive cells, microphones, and piezoelectric transducers, among others.

The DAQ device 104 is configured to acquire or generate signals of various I/O types. In particular, the I/O types comprise analog input signals, analog output signals, digital input signals, digital output signals and counter/timer inputs and outputs. The analog input and output signals are received and generated, respectively, on analog "channels" of the DAQ device 104. The digital input and output signals are received and generated, respectively, on digital I/O "ports" of the DAQ device 104. Each channel, port or counter preferably has an associated number which uniquely identifies it with respect to the DAQ device 104 on which it resides.

Examples of DAQ device 104 are the following products available from National Instruments Corporation: E Series Multifunction I/O boards, such as the AT-MIO-16 series analog input boards, the AT-AO-6/10 series analog output boards, the PC-DIO-96 digital I/O board, the PC-TIO-10 counter/timer I/O board. Examples of the SCXI circuitry 108 are the following products available from National Instruments Corporation:

SCXI-1000 4-slot chassis, the SCXI-1100 32-channel multiplexer amplifier module, and SCXI-1160 16-channel power relay module.

Figure 3:
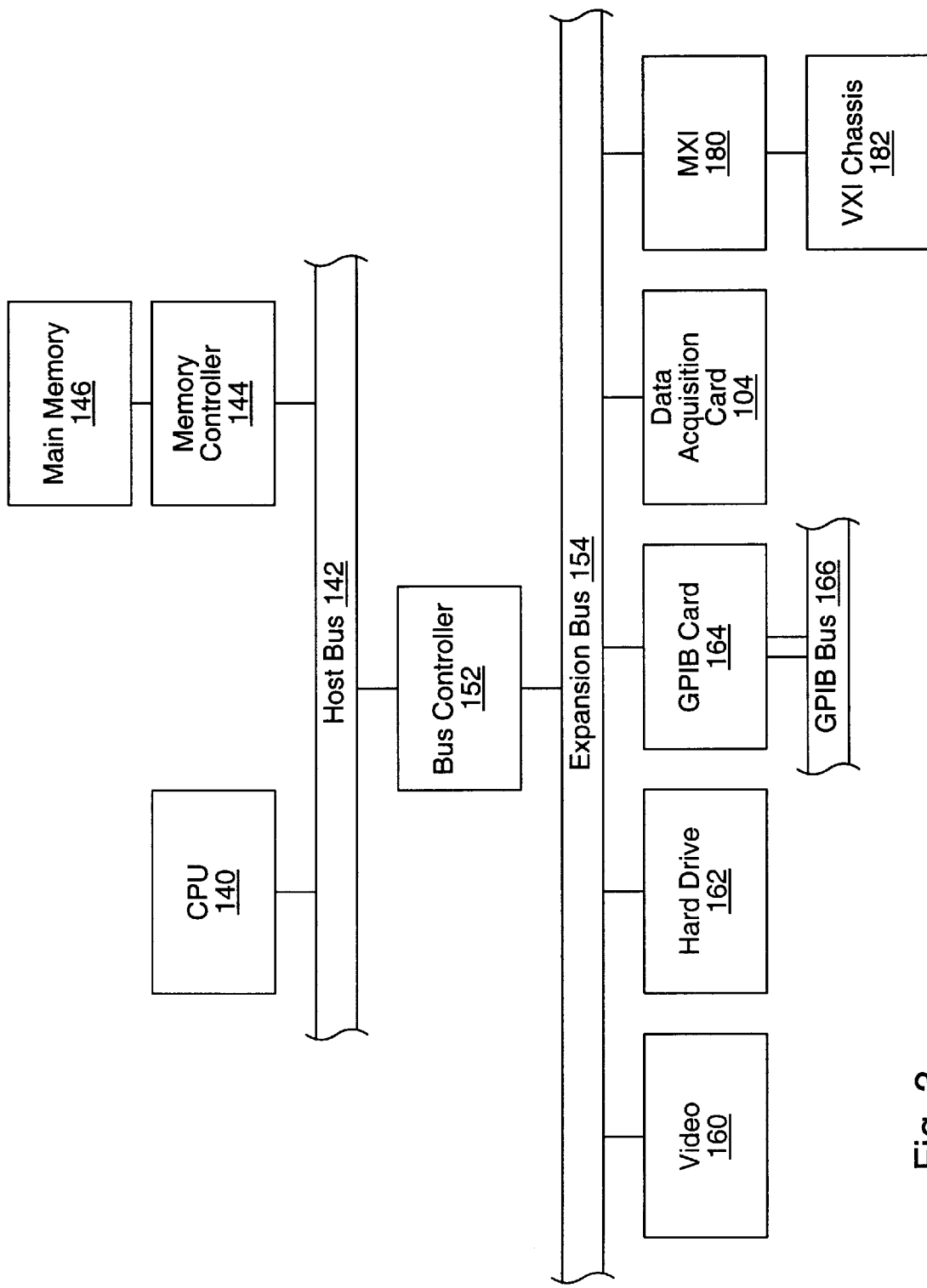
FIG. 3 is a block diagram of a computer system architecture of the computer system of FIG. 2.

FIG. 3—Computer Block Diagram

FIG. 3 illustrates a representative block diagram of the computer system 102, wherein the computer system 102 may be an RDA client computer 80 or an RDA server computer 100. It is noted that the computer system 102 may have various different architectures, as desired. The elements of a computer system not necessary to understand the operation of the present invention have been omitted for simplicity.

The computer system 102 includes a central processing unit or CPU 140 which is coupled to a processor or host bus 142. The CPU 140 may be any of various types, including an Intel x86 processor such as the Pentium class from Intel, a PowerPC CPU from the Motorola family of processors, as well as others.

Main memory 146, also referred to as system memory 146, is coupled to the host bus 142 by means of memory controller 144. The system memory 146 stores various software used in the DAQ system 100, including DAQ driver level software according to the present invention. The DAQ driver level software is preferably NI-DAQ, version 6.0 or later, from National Instruments. In the preferred embodiment, the DAQ driver level software implements the RDA features for both the client computer 80 and the server computer 100. It is noted that the RDA features of the present invention may be implemented in any of various software programs, as desired.

In the case of a client computer 80, the system memory 146 also stores a DAQ user application, such as LabVIEW, LabWindows CVI, BridgeVIEW, ComponentWorks, the DAQ Channel Wizard, etc. The DAQ user application makes calls which operate to invoke local or remote DAQ devices. The system memory 146 may store other software or other DAQ related software, as desired. A server computer 100 may also include a DAQ user application Host bus 142 is coupled to an expansion or input/output bus 154 by means of a bus controller 152. The expansion bus 154 is preferably the PCI (Peripheral Component Interconnect) bus, and the bus controller 152 is preferably chipset logic, available from Intel Corporation. The expansion bus 154 includes slots for various devices, including video 160. A non-volatile memory or hard drive 162 is comprised in the computer system 102 and may be coupled to the expansion bus 154 or to the chipset 152, or to other logic. The non-volatile memory 162 stores an operating system, DAQ software, as well as other application programs, for loading into the system memory 146 as known in the art.

Data acquisition device or card 104 is connected to the expansion bus 154. The data acquisition card 104 receives analog (or digital) signals from an external sensor or instrument and in turn produces digital data that is provided to the CPU 140 and/or the system memory 146, The DAQ card 104 may also generate signals to the sensors. The DAQ card 104 is controlled by the local DAQ driver level software executing in the computer system to which the DAQ device 104 is coupled. As discussed below, the DAQ driver level software is operable to control the DAQ device 104 in response to calls made by a local DAQ user application executing on the local computer (server computer 100) or calls made by a remote DAQ user application, a client DAQ application executing on client computer 80.

The computer system 102 may also include a GPIB (General Purpose Interface Bus) card 164 that interfaces to one or more instruments via the GPIB bus 166, and may include a MXI card 180 that connects to a VXI chassis 182.

Figure 4:
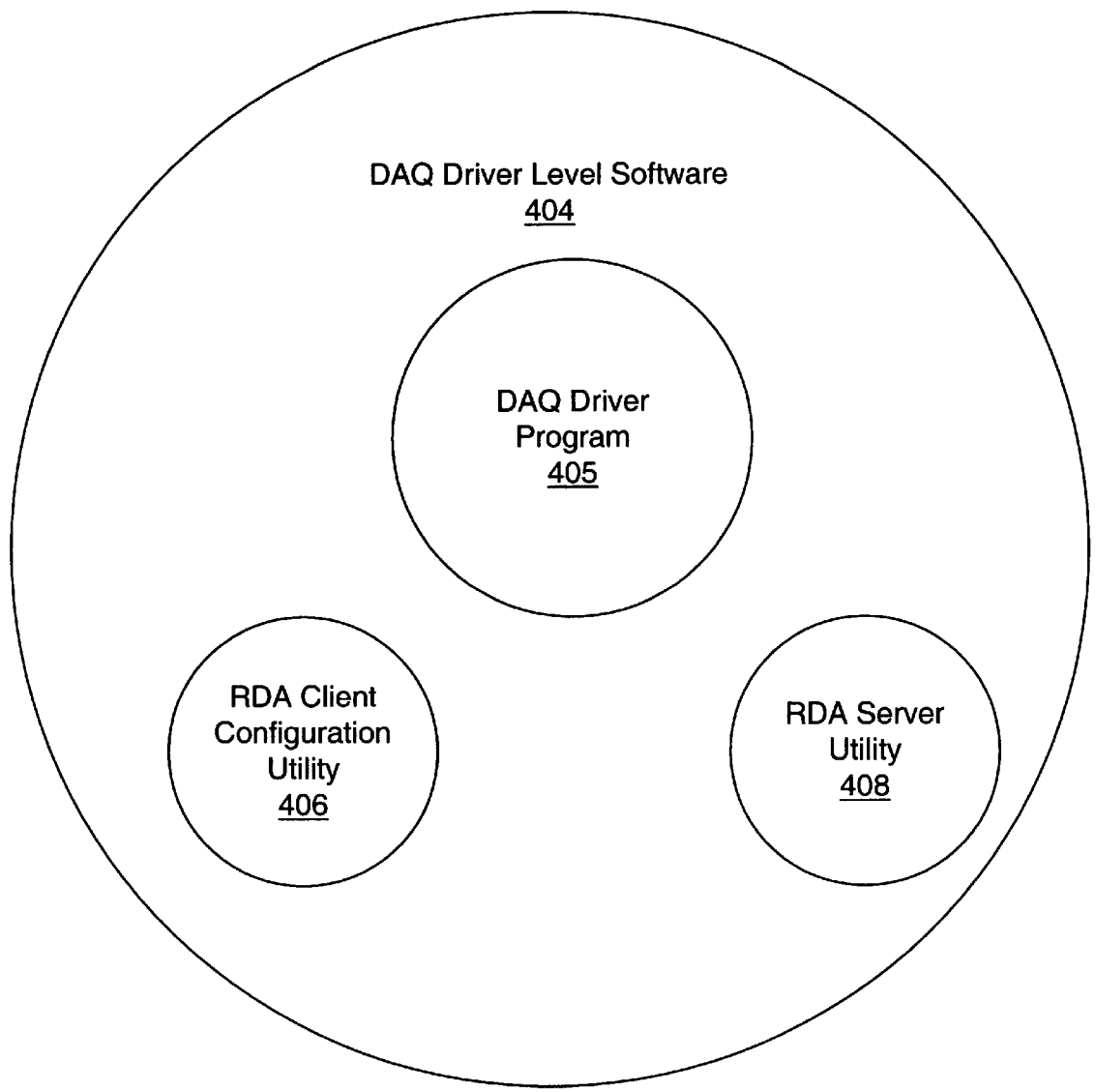
FIG. 4 illustrates the software components comprised in the DAQ driver level software.

FIG. 4—DAQ Driver Level Software

FIG. 4 illustrates the software components comprised in the DAQ driver level software 404 according to the preferred embodiment of the present invention. As shown, the DAQ driver level software 404 comprises a DAQ driver program 405. The DAQ driver program 405 comprises the primary drivers, DLLs etc. for performing the DAQ driver level functions, ire., for interfacing between a client DAQ application and a DAQ hardware device.

In the preferred embodiment of the invention, one or more additional programs or utilities are shipped with, or are included with, the DAQ driver level software which operate to enable the RDA features of the present invention. Thus, when a customer purchases the DAQ driver level software, the one or more programs and/or utilities are included which enable the RDA feature of the present invention. However, it is noted that the RDA configuration utilities and/or their applications required to implement the RDA features of the present invention may be sold separately and/or comprise separate programs, DLLs objects, etc. as desired.

In the preferred embodiment, the DAQ driver level software 404 includes an RDA client configuration utility 406. The RDA client configuration utility 406 is executable to configure a computer to operate as an RDA client. The DAQ driver level software 404 also includes an RDA server utility 408. The RDA server utility 408 is executable to configure a computer as an RDA server computer 100, wherein one or more DAQ devices coupled to the RDA server computer are accessible or usable by a client application program executing on an RDA client computer 80. The RDA server utility 408 is executable to interface between the call received by the RDA server and the DAQ driver program 405. In the present disclosure, the terms DAQ driver level SW 404 and DAQ driver program 405 are used interchangeably.

Figure 5:
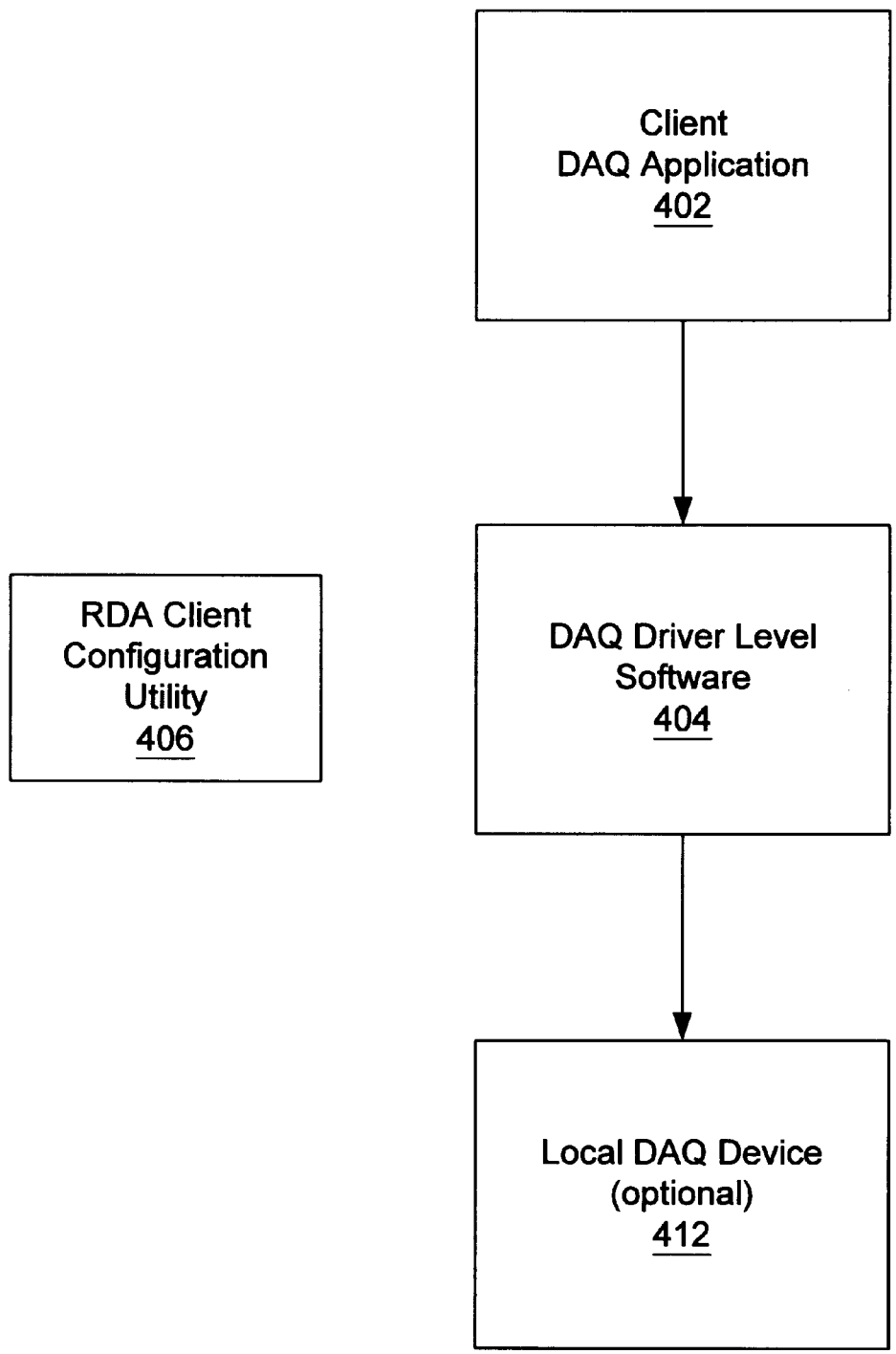
FIG. 5 illustrates the RDA client software/hardware hierarchy of an RDA client computer of FIGS. 1, 1A or 1B.

FIG. 5—RDA Client Software Architecture

FIG. 5 illustrates an RDA client software architecture according to the preferred embodiment of the present invention. More particularly, FIG. 5 illustrates the RDA client software/hardware hierarchy.

As shown, the RDA client computer 80 includes a client DAQ application 402.

The client DAQ application 402 provides an interface to the user of the DAQ system.

The user receives output via output devices of the computer, such as a display screen, and provides input via input devices such as a mouse or keyboard of the computer (of FIG. 2) to direct the acquisition or generation of field signal data. In addition, the DAQ application calls functions of or invokes objects in the DAQ driver level software to configure or control a local or remote DAQ device.

As discussed above, the client DAQ application 402 requires no modifications to use the RDA features of the present invention. In other words, access to remote DAQ devices is transparent to the client DAQ application 402. Thus, any pre-existing or previously created client DAQ application 402 can be used in the client computer 80, wherein the client DAQ application 402 takes advantage of the RDA features of the present invention. In the current embodiment, the client DAQ application 402 comprises programs written in the LabVIEW programming environment or the LabWindows CVI Easy I/O library. However, the client DAQ application 402 can take any of various forms as desired.

The client DAQ application 402 makes calls to client DAQ driver level software 404 to control a DAQ device, wherein the DAQ device may be local or remote. In the preferred embodiment, the DAQ driver level software 404 includes or implements the RDA features of the present invention. As mentioned above, the DAQ driver level software 404 includes the RDA client configuration utility 406 which is used to configure the RDA client computer 80 to enable remote device access to a remote DAQ device coupled to an RDA server computer 100. The RDA client configuration utility 406 is used for configuration of the client computer 80 and is not used during calls made by the client DAQ application 402.

The operation of the DAQ driver level software 404 and the RDA client configuration utility 406 are discussed further below. It is noted that the RDA server utility 408 is not used in the client computer 80.

As shown, the DAQ driver level software 404 optionally operates to configure and/or control a local DAQ device 412. Thus, if the RDA client computer 80 includes a local DAQ device, the client DAQ application 402 may operate to make calls to the client DAQ driver level software 404 to control this local DAQ device 412. As discussed above, according to the present invention the client DAQ application 402 may also make calls to the client DAQ driver level software which operate to control or access functionality of a remote DAQ device comprised in an RDA server computer 100. As also noted above, the location of the DAQ device, i.e., whether the DAQ device is local or remote, is invisible to the client DAQ application 402.

Figure 6:
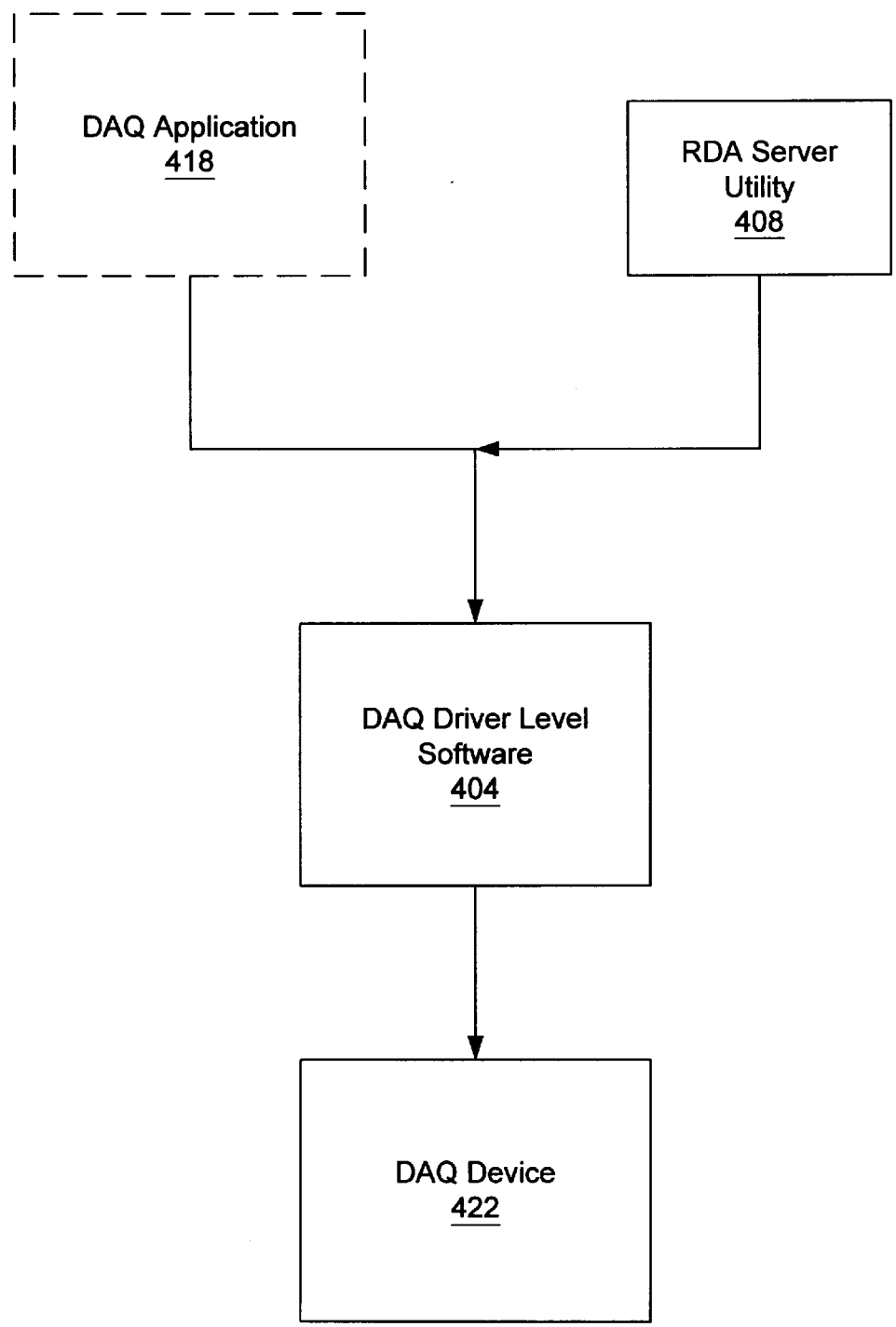
FIG. 6 illustrates the RDA server software/hardware hierarchy of an RDA server computer of FIGS. 1, 1A or 1B.

FIG. 6—RDA Server Software Architecture

FIG. 6 illustrates the RDA server software architecture according to the preferred embodiment of the invention. More specifically, FIG. 6 illustrates the RDA server software/hardware hierarchy. As shown, the RDA server computer 100 includes the RDA server utility 408. The RDA server utility 408 executes as an application above the DAQ driver level software 404. The RDA server utility 408 interfaces received calls to the server DAQ driver software 404. The RDA server utility 408 thus enables remote device access of one or more DAQ devices coupled to the RDA server computer 100. It is noted that the RDA server computer 100 is not required to include any application software. However, the RDA server computer may include DAQ application software 418 as desired.

The RDA server computer 100 also includes the DAQ driver level software 404 according to the present invention. As mentioned above, in the preferred embodiment the RDA server utility 408 receives and unpackages a call from a client computer 80, and then provides the call to the DAQ driver level software 404. The DAQ driver level software 404 then executes the call to implement the RDA features of the present invention. The operation of the DAQ driver level software 404 and the RDA server computer 408 are discussed further below. It is noted that the RDA client configuration utility 406 is not used in the RDA server computer 100.

As shown, the DAQ driver level software interfaces to a DAQ device 422. In FIG. 6, the DAQ device 422 comprises a remote DAQ device, such as device 104 of FIG. 2, which is accessed or controlled by the client DAQ application 402 executing in the RDA client computer 80.

It is further noted that a single computer system may be configured both as an RDA client computer 80 and an RDA server computer 100. In other words, a computer system configured both as an RDA client and an RDA server includes each of the software elements shown in FIGS. 5 and 6.

Figure 7:
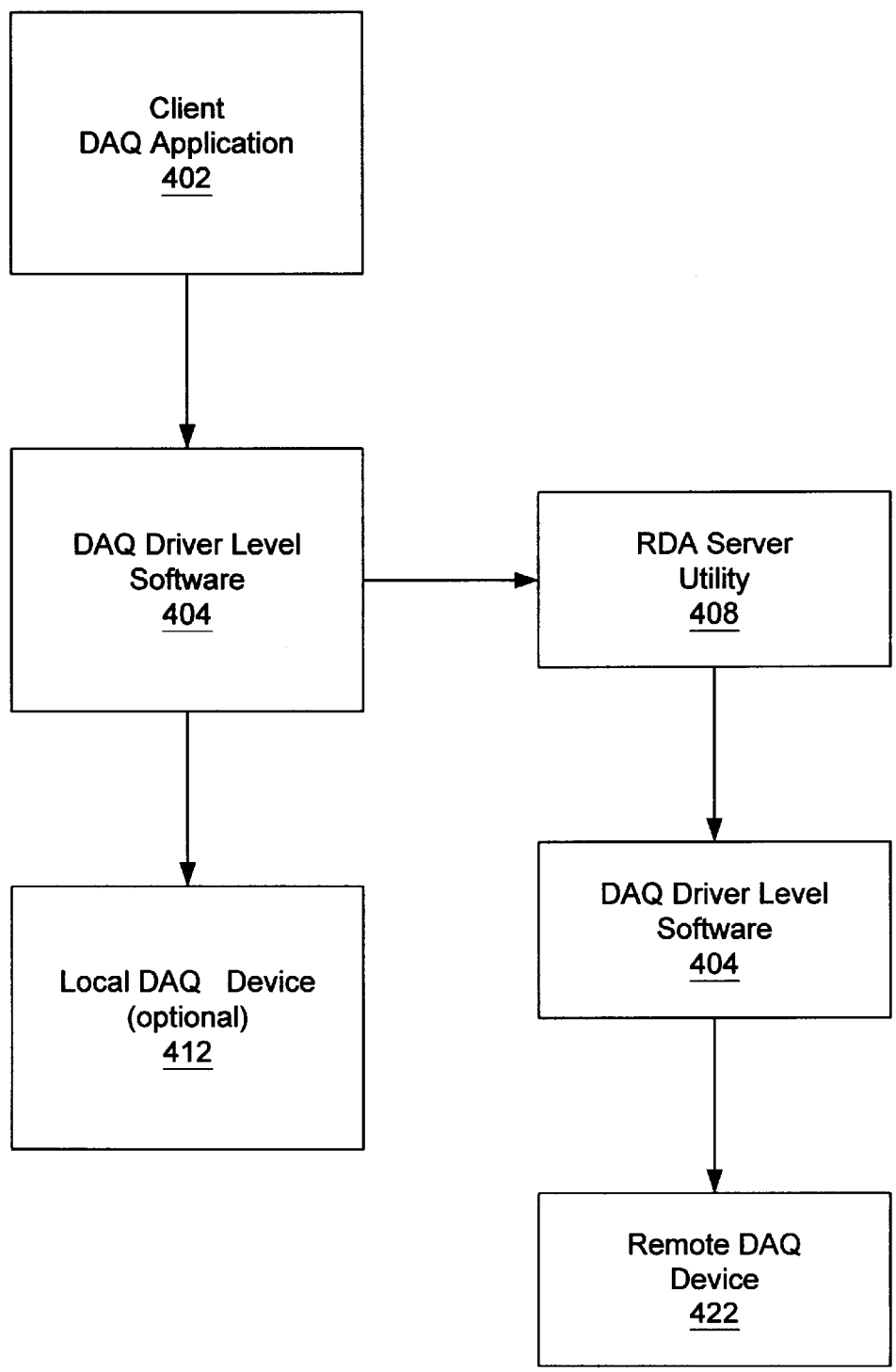
FIG. 7 illustrates operation of the RDA client and RDA server components operating to provide the remote device access feature of the present invention.

FIG. 7—RDA Client/Server Operation

FIG. 7 illustrates the operation of the various components in the RDA client computer 80 and the RDA server computer 100 in performing the remote device access feature of the present invention. According to the preferred embodiment of the invention, the client DAQ application 402 executing in the RDA client computer 80 makes a call to the client DAQ driver level software 404 executing on the RDA client computer 80. The client DAQ driver level software 404 executing on the RDA client computer 80 operates to detect that the call actually accesses a remote device, and operates to package the call and transfer the call across the network 90.

The call is received by the RDA server utility 408, which operates to unpackage the call and provide the call to the DAQ driver level software 404 executing on the RDA server computer 100. The DAQ driver program 405 executes the call to invoke functionality on the remote DAQ device 422. After the DAQ device has performed the desired function as a result of execution of the call, any resultant data is returned to the client computer 80.

FIG. 8—Flowchart Diagram

Figure 8A:
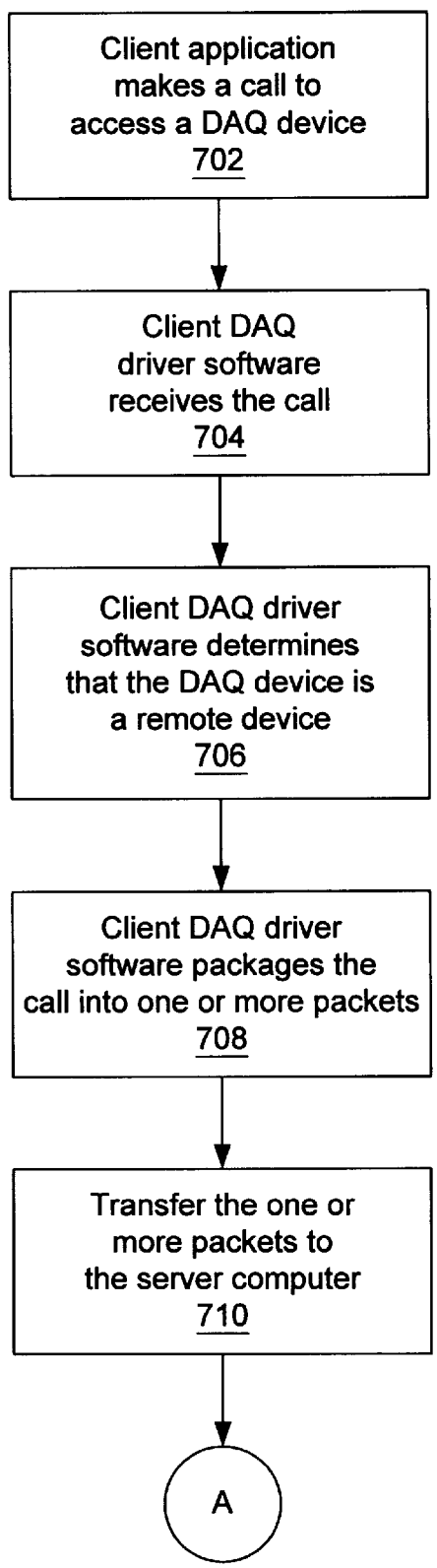
FIGS. 8A and 8B are a flowchart diagram illustrating operation of the present invention.
Figure 8B:
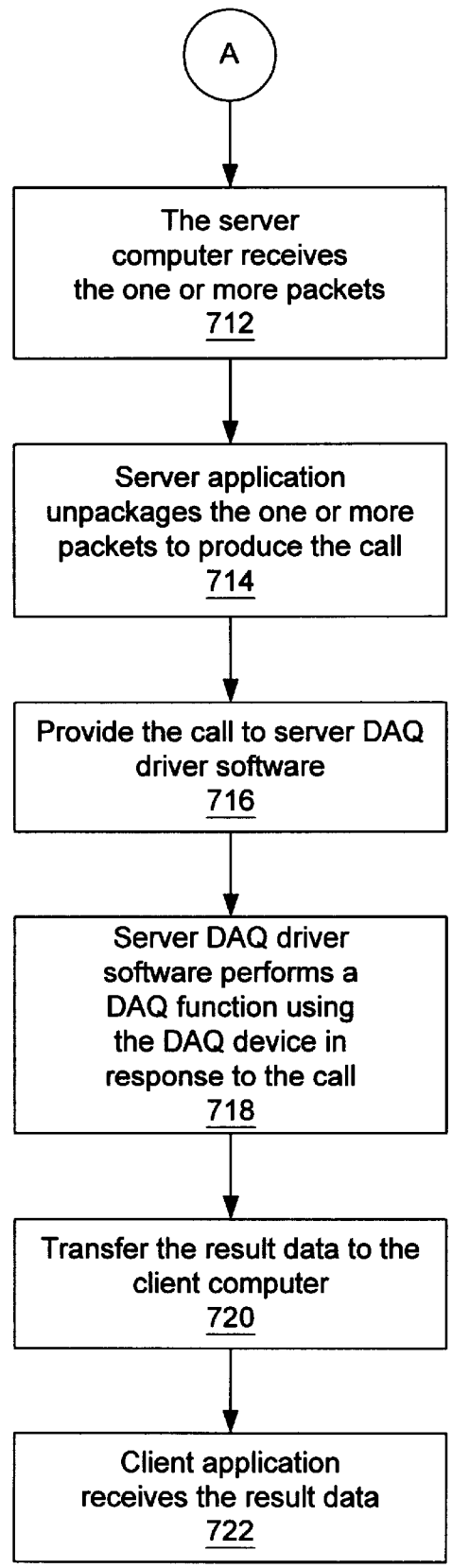

FIGS. 8A and 8B are a flowchart diagram which illustrates operation of the remote device access (RDA) features according to the preferred embodiment of the invention. FIGS. 8A and 8B can be best understood when viewed in conjunction with FIG. 7.

As shown, in step 702 the client application or user application 402 makes a call to access or control a DAQ device. This involves the client DAQ application 402, making a call to the client DAQ driver level software 404 executing on the client computer 80. The call made by the client DAQ application 402 includes a device number which identifies the DAQ device on which the call is intended to be performed. The call may be for a local DAQ device coupled to the local client computer 80, or may be for a remote DAQ device coupled to a remote computer, referred to as server computer 100.

In step 704 the client DAQ driver level software 404 receives the call made by the client application in step 702.

In step 706 the client DAQ driver level software 404 examines the device number included in the call and determines the family of product to which the device belongs. According to the present invention, the client DAQ driver level software 404 includes a remote devices product family.

If the client DAQ driver level software 404 determines that the call is intended for a local DAQ device, i.e., the device number does not indicate the remote devices product family, then the call is executed by the client DAQ driver level software 404 on the local DAQ device as would normally occur. If the client DAQ driver level software 404 determines that the call is intended for a remote DAQ device 422, i.e., the device number indicates the remote devices product family, then in step 708 the client DAQ driver level software 404 packages the call into one or more packets.

In step 710 the client DAQ driver level software 404 transfers the one or more packets to the server computer 100. In the preferred embodiment, the client DAQ driver level software 404 transfers the one or more packets to the server computer 100 using a Remote Procedure Call (RPC) and using TCP/IP. However, the one or more packets can be transferred any number of ways, as desired. For example, the transfer could involve directly using a protocol stack instead of RPC.

In step 712 the RDA server utility 408 executing on the server computer 100 receives the one or more packets. In step 714 RDA server utility 408 unpackages the one or more packets to produce the call, i.e., to produce the original call made by the client DAQ application. In step 716 the RDA server utility 408 provides the call to the DAQ driver level software 404 on the server computer 100. Thus, the RDA server utility 408 receives the call, unpackages it, and sends the unpackaged call to server DAQ driver level software 404 on the remote or server computer 100. To the DAQ driver level software 404 on the server computer 100, the call is a standard or "plain vanilla" DAQ call. In other words, the DAQ driver level software 404 on the server computer 100 is unaware as to whether the call originated from a DAQ application existing on the server computer 100 or from the client DAQ application executing on the client computer 80.

The device number of the call used on the remote computer is preferably the actual device number of the device. Thus, when the DAQ driver level software 404 examines the device number on the remote computer to see what family of product to which it belongs, the DAQ driver level software 404 does not determine a "remote device". Rather, the DAQ driver level software 404 determines that the device is a DAQ device 422 coupled to the server computer, e.g., a DAQ card 104, a USB device, etc.

In step 718 the call executes normally on the remote computer 100. In other words, in step 718 the server DAQ driver level software 404 executes the call to perform a DAQ function using the DAQ device. When the DAQ driver level software 404 on the remote computer completes execution of the call, in step 720 the results are transferred back to the client computer 80. In the preferred embodiment, the results are transferred back to the client computer 80 in the same manner that the call was transferred. In other words, the results are packaged into one or more packets and transferred to the client computer 80, where the results are unpackaged. In step 722 the client DAQ application 402 receives the result data.

It is noted that the DAQ driver level software 404 executing on the client computer 80 and the DAQ driver level software 404 executing on the server computer 100 are preferably identical.

Configuration of RDA Server Computers

The user is required to designate one or more computers to be RDA servers. The current embodiment is implemented for certain operating systems and certain transfer protocols. However, it is noted that the RDA feature of the present invention may be used with any of various operating systems and any of various transfer protocols. In the currently implemented embodiment, the RDA server computers run either Windows 95 or Windows NT 4.0, and they are connected to a network that supports the TCPIP protocol. The user is also preferably required to know either the name or the IP address of the RDA server computers 100.

The user performs the following steps to turn an ordinary computer into an NI-DAQ RDA Server computer.

1. Install the DAQ driver level software (NI-DAQ).
2. Install and configure the data acquisition devices.
3. Ensure the DAQ devices are working properly by testing their resources with the Test Panels.
4. Launch the NI-DAQ RDA Server Utility. A shortcut to this utility is in the Start menu in the Remote Device Access sub-menu under the NI-DAQ for Windows selection. If the user desires that this computer become an RDA server every time it starts up, the user places a shortcut to the NI-DAQ RDA Server Utility in the Startup folder. There is no interface to interact with. The window will only say that the RDA Server is in operation.

Configuration of RDA Client Computers

After the user has configured one or more RDA server computers 100, the user then designates or configures one or more computers to be RDA clients. In the current implementation, the client computers also run either Windows 95 or Windows NT 4.0, and are connected to a network that supports the TCP\IP protocol.

The user performs the following steps to turn an ordinary computer into an RDA Client computer.

1. Install a client DAQ application, e.g., either LabVIEW or LabWindows/CVI.
2. Install the client DAQ driver level software (NI-DAQ).
3. Start the NI-DAQ RDA Configuration Utility. A shortcut to this utility is in the Start menu in the Remote Device Access sub-menu under the NI-DAQ for Windows selection.
4. Locate the computer that has previously been configured as an RDA Server using either of the following steps:
   If the IP address of the RDA server computer is known, simply enter it into the Remote Name/IP Address field of the RDA Configuration Utility and click on the Connect button.
   Use the network tree interface at the left of the utility to explore the network. Click on the Network label to reveal the network names and continue clicking to find the domain names and computer names. When the name of the RDA server computer is found, the user highlights it by clicking once on its name. The name will appear in the Remote Name/IP Address field. Now, click on the Connect button. Or, if the computer name is already known, just type it in and connect. If the domain name is also known, the user can append it to the computer name as well (example: mycomputer.natinst.com).
5. Once the user has connected to the RDA server, a list of remote devices installed on that server appears in the box on the lower right of the utility. Select one of these devices by clicking once on its listing (the user must click on the entry in the Remote Device # column) and then click on the Assign button. A dialog box appears with a list of possible local device numbers. Select one of these and click on OK and then click on Exit. The local device number chosen by the user will be the one used in the local or client programs.
6. If the user later desires to connect to a different computer, click on the Disconnect button (instead of Exit) and follow step 4 to connect to another computer.

Once the user has finished these steps, then configuration is complete. The user can write an application that uses a single remote device, multiple remote devices on a single remote computer, multiple remote devices on multiple remote computers, or all of the above plus devices in the local computer.

If the user desires to undo a local device number assignment to a remote device, the user disconnects from the remote computer to which he/she is connected. In the RDA client configuration window, the box on the lower right lists the remote devices currently configured on the RDA client when the RDA Configuration Utility is not connected. The user highlights the device for which undo is desired and clicks on the Delete button.

SCXI Considerations

The RDA configuration utility shows the user DAQ products that have device numbers on configured RDA servers. Once a local device number is assigned, the user is no longer required to know the actual device number on the remote machine. However, in the current implemented embodiment, the RDA configuration utility does not provide information about any SCXI products configured on the RDA server.

When it is desired to use SCXI equipment on a remote computer via RDA from a local computer, the exact chassis IDs and module slot numbers that are assigned to the SCXI products on the remote computer are required to be used. For example, assume a National Instruments SCXI-1100 in module slot 3 in an SCXI-1000 chassis with chassis ID 2 connected to a National Instruments PCI-MIO DAQ card with device number 1 on a remote computer. Using the RDA configuration utility on the client computer, the user assigns the remote PCI-MIO card a local device number of 10. The user then runs Acquire N Scans, and enters the device number of 10. The channel string entered is "'sc2!md3!ch0". Thus, the user must remember his/her SCXI configurations on RDA servers when SCXI is used in a program on an RDA client.

In the current implemented embodiment, there is a special consideration when using any of the National Instruments SCXI-116x digital modules via RDA. The taskID produced by the DIO Port ConFIG. vi does not have the local device number embedded in it. In place of the device number, the NI-DAQ driver level software places the SCXI chassis ID number. The NI-DAQ driver level software uses the SCXI chassis ID to look up the local device number. So, if multiple servers exist which have an SCXI chassis containing SCXI-116x modules, the user must assign unique chassis IDs to all of them. It is noted that there are over 32000 available chassis IDs.

DAQ Channel Wizard Considerations

The RDA features of the present invention can be used with the DAQ Channel Wizard product available from National Instruments. For more information on the DAQ Channel Wizard, please see U.S. patent application Ser. No. 08/756,401 titled "DAQ Configuration System and Method for Configuring Channels in a Data Acquisition Device" filed Nov. 27, 1996, referenced above.

In order to use the DAQ Channel Wizard in an RDA application, the user:

1. Runs the Channel Wizard on the RDA server computer (not the RDA client).
2. When named channels are used in the RDA client application, the user must also supply the local device number of the device on the RDA server.

For example, assume a National Instruments PCI-MIO DAQ card connected to the server computer. The user then configures a named channel on the server called "channel 1". Next, the RDA configuration utility is run on the client. The user assigns a local device number of 10 to the PCI-MIO DAQ card on the server. Now, assume that the user desires to run "Acquire N Scans" and it is desired to use the named channel. In order to run "Acquire N Scans" using the named channel, the user enters the local device number of 10 into the device control, types the named channel ("channel 1") into the channel string, and runs.

The reason the local device number must be used even though named channels are being used is that the information needed by NI-DAQ to translate the named channel to a device number and a channel number exists only on the server. In order for the NI-DAQ driver level software to realize the call is supposed to go to a server, the DAQ driver software must have access to the local device number. The Channel Wizard cannot be used on the client to configure named channels on a server because, in the current embodiment, the Channel Wizard, like the NI-DAQ Configuration Utility, is unaware of any remote devices. In an alternate embodiment, both the Channel Wizard and the NI-DAQ Configuration Utility are aware of remote devices, and thus in this embodiment the Channel Wizard can be used on the client to configure named channels on a server.

Current Implementation Details

In the current implementation, in order to use the RDA feature of the present invention, the computers involved run Windows 95 or Windows NT 4.0 (any combination will do), and the network protocol used is TCP/IP.

The preferred client DAQ applications are LabVIEW and the CVI Easy IO library. Although LabVIEW programs require no modifications to use RDA, four LabVIEW VIs are not supported in the current implementation. The DAQ Occurrence Config vi is not currently supported and thus, if the client program uses the messaging feature of NI-DAQ, it will not work properly when run on a remote device. The Vis Get SCXI Information, SCXI Cal Constants, and Set SCXI Information are also not supported. If the client program uses one of these it may not work properly when run on remote devices. However, acquisition and control with SCXI products is fully supported with RDA along with all other AT, PCI, PCMCIA, VXI, PXI, USB and parallel port products.

When a local device number is assigned to a remote device, the NI-DAQ driver level software attempts to connect to the RDA server computer each time the driver software loads in the client computer. If the RDA server is not turned on, the client computer will attempt to connect to the server computer for a timeout period, and then discontinue the attempt. When the attempt to connect at load time fails, any attempt to use the remote device results in a -10401 (unknownDeviceError) status code. If the initial attempt at making a connection succeeds, but the connection disappears at a later time (if the RDA server program is terminated for example), any attempt to use the remote device after the connection is gone will produce the -10340 (noConnectError) status code.

When an RDA client makes a call to an RDA server, the client application is preferably blocked until the server responds. If the connection fails during this blocking, the client will report an error. For example, if the client is a LabVIEW program and makes a call to AI Buffer Read that waits on the server for the data to be acquired (acquire data at 10 scans/second and ask for 100 scans), and the server program on the server is terminated after the call, then the client application will emit a "-10340 status code" dialog box and the VI will terminate. If the client is a CVI Easy IO program and makes a call to AI Acquire Waveform(s) to acquire 10 seconds worth of data and the server program on the server is terminated after the call, then the client application will emit a -10340 status code and terminate. It is also important to note that the RDA server computer (the remote computer) is a slave to the client computer. The RDA server computer can do nothing on its own without responding to a request from the RDA client computer.

Data Transfer

In the preferred embodiment, the RDA feature of the present invention uses Remote Procedure Calls, also known as RPC. Microsoft's implementation of RPC is based on the Open Software Foundation's definition as part of their Distributed Computing Environment (DCE). RPC is designed to be both operating system and hardware independent. RPC supports all popular protocols: TCP/IP, NetBEUI, IPX/SPX, Named Pipe and Windows Sockets. In the current Implementation, the RDA feature of the present invention currently supports only TCP/IP. However, it is noted that various other mechanisms can be used for transferring DAQ calls from the client computer 80 to the server computer 100.

The actual C code for marshalling parameters and sending them over the network (i.e., making an RPC call) is produced by Microsoft's Interface Definition Language (MIDL) compiler. The Interface Definition Language (IDL) is also part of the OSF/DCE spec for RPC. IDL was originally called NIDL, where the N stood for network.

The MIDL compiler takes as input an IDL file and an optional Attribute Configuration File (.ACF, aka Application Configuration File) and translates them to C code. The parts of an IDL file are:

a) A uuid, version number and pointer default declaration
b) a name for the interface which is prepended to symbols generated by MIDL. In the preferred embodiment, the interface name is nidaqr.
c) imported (not #included) header files
d) function descriptions The uuid is a Universal Unique Identifier, another OSF spec. The uuid is generated by running uuidgen.exe, which Microsoft Visual C++ installs in the bin directory. Along with the uuid, uuidgen.exe will generate a skeleton .IDL file when uuidgen is run as follows: uuidgen -i -o<skeleton.idl>. The function descriptions are basically prototypes with added keywords enclosed in square brackets in front of each function argument. The keywords used are in, out, unique and size_is. A function argument is [in] when its data needs to be copied from the client to the server only. An argument is [out] when its data needs to copied only from the server back to the client. An argument is [in, out] when its data is copied in both directions. The unique keyword refers to a type of pointer and is more complicated.

There are three pointer types in the RPC world: Reference, Unique and Full.

Reference Pointers:

Always point to valid storage and cannot have the value NULL.

They never change during a call. A reference pointer points to the same place before, during and after the call. Data returned from the server is copied over the storage space on the client.

The data referred to by the pointer may not be accessed by any other pointer (no aliasing).

If no attribute is specified for a top level pointer it is treated as a reference pointer.

Are the most efficient type but also the most restricted. They are usually used to "implement pass-by-value semantics and to allow for [out] parameters" .

Unique Pointers:

They can have the value NULL.

Can change during a call from NULL to non-NULL and vice-versa and also from one non-NULL value to another.

They can orphan memory on client side if they change value to NULL and if there is no other means of accessing original memory.

Unique attribute cannot be applied to [out] only top-level pointer parameters. A top-level pointer is present in the parameter list (ie. passed via the stack).

Full Pointers:

Have no restrictions.

Are not supported by Microsoft's RPC 1.0.

Pointers in RDA

All embedded pointers (pointers that appear in structures, unions, arrays and in function return types) are [unique].

All top-level [in] and [in,out] pointers are also [unique]. Top-level [out] pointers are reference The pointer default declaration specifies the default attribute for all pointers except top-level pointers that appear in parameter lists. The default in RDA is [unique].

The ACF file specifies the type of RPC binding handle we use. There are three types of binding handles.

Explicit handles must be passed in to each RPC call as the first argument. Explicit handles allow the RPC client to use multiple servers, since each handle can target a different server.

Implicit handles are declared as globals by the MIDL compiler. Thus, they are not passed in to the RPC calls, the global handle is used instead. Obviously, there can be only one handle and, thus one server active at a time.

Auto handles are the easiest to use. The code that MIDL generates uses the RPC Name Service database to locate and bind to a server. If the ACF file is not provided or the handle type is not specified, the MIDL compiler will generate code that uses auto handles.

In the preferred embodiment, RDA uses explicit handles.

For more information on RPC, please see "Network Programming in Windows NT", by Alok K. Sinha (Addison-Wesley); "Windows NT Network Programming", Ralph Davis (Addison-Wesley); and "RPC for NT", Guy Eddon (R&D Technical Books), all of which are hereby incorporated by reference as though fully and completely set forth herein.

DAQ Driver Level Software Function Vectoring

The DAQ driver level software of the preferred embodiment, NI-DAQ, includes a function vectoring scheme, and the RDA feature of the present invention exploits the NI-DAQ C++ class based function vectoring scheme. The preferred embodiment creates a new subclass called the remoteDevice class.

RPC stubs

The preferred embodiment includes a file called Nidqclnt.cpp, which contains remoteDevice:: versions of LabVIEW layer functions that can be generated automatically by the NI-DAQ code generation tool, referred to as supergen. These are the RPC stub functions and are called on the client side only.

The basic outline for a remoteDevice:: version of a LabVIEW layer function is:

```
remoteDevice::LVLayerFunc ()
{
    i16 status;
    RpcTryExcept
    {
        Rmt_LVLayerFunc (..., &status);
    }
    RpcExcept (1)
    {
        status=noConnectError;
    }
    RpcEndExcept
    return status;
}
```

The structured exception handling macros were added by Microsoft and are used to catch RPC errors from the Rmt_functions.

All functions that produce taskIDs are required to have the remote device number stripped out of the taskiD and the local device number put in. Likewise, all functions accepting taskIDs as inputs need the local device number removed and the remote device number put in. For the latter case, the following line is inserted:

u32 newTaskID_Or_deviceID=(taskID & 0xFFFFFF00) |remoteDeviceNumber;

RemoteDeviceNumber is one of the protected data members of the remoteDevice class.

All Rmt_functions accept the RPC binding handle as their first parameter. Instead of passing the handle in directly each stub makes a function call to get the handle. If the handle does not exist yet for the device, one is created. In general, RPC binding handles must be created in the context of the process in which they will be used. The function call makeOnTheFlyRPCConnection implements a kind of lazy binding.

The basic skeleton of a remoteDevice:: version of a LabVIEW layer function appears as follows:

```
remoteDevice::LVLayerFunc (taskID,...)
{
    i16 status;
    u32 newTaskID_Or_deviceID = (taskID & 0xFFFFFF00)|
        remoteDeviceNumber;
RpcTryExcept
    {
    Rmt_LVLayerFunc (
                makeOnTheFlyRPCConnection(_deviceNumber),
                newTaskID_Or_deviceID,
                ...,
                &status);
    }
    RpcExcept (1)
    {
        status=noConnectError;
    }
    RpcEndExcept
    return status;
}
```

_deviceNumber is the local device. It is a protected data member of the base class daqDevice.

Many of the remoteDevice:: RPC stubs must also pass in the size of the memory blocks pointed to by pointers in their argument lists. Supergen automates much of this code as well. For every RPC stub than can be automatically generated, the supergen component grpcclnt.cpp generates helper function prototypes for all BUFFER_ type parameters in the file rpccllen.h. The implementations are done by hand in rpccllen.cpp.

The remoteDevice:: versions of LabVIEW layer functions whose stubs cannot be automatically generated are done by hand in nidqclm.cpp. remoteDevice::AI_Single_Scan is a good example. The size of the arrays is not available from looking at any of the arguments to the function. So, a call is made to _get_AI_scan_info to get the scan width. Then, both the opcode and output_type arguments must be examined to know which array to use.

Although the system and method of the present invention has been described in connection with the preferred embodiment, it is not intended to be limited to the specific formn set forth herein, but on the contrary, it is intended to cover such alternatives, modifications, and equivalents, as can be reasonably included within the spirit and scope of the invention as defined by the appended claims.

We claim:

1. A method for remotely accessing data acquisition (DAQ) devices in a DAQ system, the method comprising:

a client application in a client computer making a call to access a DAQ device, wherein the DAQ device is located in or coupled to a server computer, wherein the server computer is coupled to the client computer through a network;

client DAQ driver software executing in the client computer receiving the call to access the DAQ device after the client application making the call;

the client DAQ driver software determining that the call to access the DAQ device is intended to access a remote DAQ device after the client DAQ driver software receives the call;

packaging the call into one or more packets;

transferring said one or more packets to the server computer, wherein said packaging and said transferring are performed in response to determining that the call is intended to access a remote DAQ device;

the server computer receiving said one or more packets after said transferring;

unpackaging said one or more packets to produce said call after the server computer receiving said one or more packets;

providing said call to server DAQ driver software executing in the server computer after said unpackaging;

the server DAQ driver software executing the call to perform a DAQ function using the DAQ device, wherein said performing said DAQ function generates result data;

transferring said result data to the client computer after the server DAQ driver software executing the call; and the client application in the client computer receiving the result data.

2. The method of claim 1, wherein the call includes a device number, wherein said device number indicates a remote device;

wherein said determining that the call is intended to access a remote DAQ device comprises examining said device number and determining that said call is to a remote DAQ device.

3. The method of claim 2, wherein the device number uniquely identifies the DAQ device located in or coupled to the server computer, the method further comprising:

the server DAQ driver software executing in the server computer examining the device number to determine the DAQ device in the server computer after said providing said call to the server DAQ driver software executing in the server computer and prior to the server DAQ driver software executing the call.

4. The method of claim 1, further comprising:

configuring the client computer with access information of the server computer prior to the client application making the call.

5. The method of claim 1, wherein a server program executes in the server computer;

wherein the server program operates to receive said one or more packets, unpackage said one or more packets to produce the call, and provide the call to the server DAQ driver software.

6. The method of claim 1, wherein said transferring is performed using a remote procedure call (RPC).

7. The method of claim 1, wherein a local DAQ device is coupled to the client computer, the method further comprising:

the client application making a call to access the local DAQ device;

the client DAQ driver software executing in the client computer receiving the call to access the local DAQ device after the client application making the call;

the client DAQ driver software determining that the call to access the DAQ device is intended to access a local DAQ device after the client DAQ driver software receives the call;

the client DAQ driver software executing the call to perform a DAQ function using the local DAQ device in response to determining that the call is intended to access the local DAQ device.

8. The method of claim 1, wherein said method is performed for two or more remote DAQ device coupled to two or more different server computers.

9. The method of claim 1, wherein said method is performed by two or more client computers.

10. The method of claim 1, wherein the client application performs a virtual instrumentation function.

11. A method for remotely accessing data acquisition (DAQ) devices in a DAQ system, the method comprising:

a client application in a client computer making a call to access a DAQ device, wherein the DAQ device is located in or coupled to a server computer, wherein the server computer is coupled to the client computer through a network;

determining that the call to access the DAQ device is intended to access a remote DAQ device after the client application making the call;

transferring the call to the server computer, wherein said transferring is performed in response to determining that the call is intended to access a remote DAQ device;

server DAQ driver software executing in the server computer executing the call to perform a DAQ function using the DAQ device, wherein said performing said DAQ function generates result data;

transferring said result data to the client computer after the DAQ driver software executing the call; and the application in the client computer receiving the result data.

12. The method of claim 11, wherein said transferring the call comprises:

packaging the call into one or more packets;

transferring said one or more packets to the server computer, wherein said packaging and said transferring are performed in response to determining that the call is intended to access a remote DAQ device;

the server computer receiving said one or more packets after said transferring;

unpackaging said one or more packets to produce said call after the server computer receiving said one or more packets.

13. The method of claim 11, wherein client DAQ driver level software executes on the client computer;

wherein the client DAQ driver level software performs said determining.

14. The method of claim 11, wherein the call includes a device number, wherein said device number indicates a remote device;

wherein said determining that the call is intended to access a remote DAQ device comprises examining said device number and determining that said call is to a remote DAQ device.

15. The method of claim 14, wherein the device number uniquely identifies the DAQ device located in or coupled to the server computer, the method further comprising:

the server DAQ driver software executing in the server computer examining the device number to determine the DAQ device in the server computer after said providing said call to the server DAQ driver software executing in the server computer and prior to the server DAQ driver software executing the call.

16. The method of claim 11, further comprising:

configuring the client computer with access information of the server computer prior to the client application making the call.

17. The method of claim 11, wherein said transferring is performed using a remote procedure call (RPC).

18. A data acquisition (DAQ) system, comprising:

a server computer:

a remote DAQ device coupled to the server computer;

a client computer coupled to the server computer through a network, wherein a client application is stored in the client computer, wherein the client application is executable to make a call to access the remote DAQ device coupled to the server computer, wherein the client computer is operable to examine the call to access the remote DAQ device and determine that the call is intended to access the remote DAQ device;

wherein the client computer is operable to package the call into one or more packets and transfer said one or more packets to the server computer in response to determining that the call is intended to access the remote DAQ device;

wherein the server computer includes server DAQ driver software stored in the server computer, wherein the server computer is operable to unpackage said one or more packets to produce said call and provide said call to the server DAQ driver software executing in the server computer;

wherein the server DAQ driver software is operable to execute the call to perform a DAQ function using the remote DAQ device, wherein execution of the call generates result data;

wherein the server computer is operable to transfer said result data to the client computer;

wherein the client application in the client computer receives the result data.

19. The DAQ system of claim 18, wherein client DAQ driver level software is stored on the client computer and executes on the client computer;

wherein the client DAQ driver level software is executable to examine the call to access the remote DAQ device and determine that the call is intended to access the remote DAQ device.

20. The DAQ system of claim 19, wherein the client DAQ driver level software is executable to package the call into one or more packets and transfer said one or more packets to the server computer in response to determining that the call is intended to access the remote DAQ device.

21. The DAQ system of claim 18, wherein the call includes a device number, wherein said device number indicates a remote device;

wherein the client computer is operable examine said device number and determine that said call is to a remote DAQ device.

22. The DAQ system of claim 21, wherein the device number uniquely identifies the DAQ device located in or coupled to the server computer;

wherein the server computer is operable to examine the device number to determine the DAQ device in the server computer.

23. The DAQ system of claim 18, wherein the client computer is configured with access information for accessing the server computer.

24. The DAQ system of claim 18, wherein a server program executes in the server computer;

wherein the server program is executable to receive said one or more packets, unpackage said one or more packets to produce the call, and provide the call to the server DAQ driver software.

25. The DAQ system of claim 18, wherein the client computer is operable to transfer said one or more packets to the server computer using a remote procedure call (RPC).

26. The DAQ system of claim 18, further comprising:

a local DAQ device coupled to the client computer;

wherein client DAQ driver level software is stored on the client computer and executes on the client computer;

wherein the client application is executable to make a call to access the local DAQ device;

wherein the client computer is operable to determine that the call to access the DAQ device is intended to access the local DAQ device;

wherein the client DAQ driver software is executable to execute the call to perform a DAQ function using the local DAQ device in response to determining that the call is intended to access the local DAQ device.

27. The method of claim 1, wherein the DAQ device is coupled to a unit under test or process, wherein the DAQ system is operable to measure signals from the unit under test or process.

28. The method of claim 1, further comprising:

the DAQ device acquiring the result data from an external source in response to the server DAQ driver software executing the call to perform the DAQ function using the DAQ device.

29. The method of claim 28, wherein the DAQ device acquires the result data from a unit under test or process being monitored or measured.

30. The method of claim 1, wherein, in response to the server DAQ driver software executing the call to perform the DAQ function using the DAQ device, the method further comprises:

the DAQ device acquiring analog data from an external source; and the DAQ device performing analog to digital conversion on the analog data to produce the result data.

31. The method of claim 1, wherein, in response to the server DAQ driver software executing the call to perform the DAQ function using the DAQ device, the method further comprises:

acquiring analog input data from an external source;

conditioning the analog input data to produce conditioned analog input data;

the DAQ device receiving the conditioned analog input data; and the DAQ device performing analog to digital conversion on the conditioned analog input data to produce the result data.

32. The method of claim 1, wherein the DAQ device comprises one or more of an analog input/output (I/O) board, or a digital input/output (I/O) board.

33. The method of claim 11, wherein the DAQ device is coupled to a unit under test or process, wherein the DAQ system is operable to measure signals from the unit under test or process.

34. The method of claim 11, further comprising:

the DAQ device acquiring the result data from an external source in response to the server DAQ driver software executing the call to perform the DAQ function using the DAQ device.

35. The method of claim 34, wherein the DAQ device acquires the result data from a unit under test or process being monitored or measured.

36. The method of claim 11, wherein, in response to the server DAQ driver software executing the call to perform the DAQ function using the DAQ device, the method further comprises:

the DAQ device acquiring analog data from an external source; and the DAQ device performing analog to digital conversion on the analog data to produce the result data.

37. The method of claim 11, wherein, in response to the server DAQ driver software executing the call to perform the DAQ function using the DAQ device, the method further comprises:

acquiring analog input data from an external source;

conditioning the analog input data to produce conditioned analog input data;

the DAQ device receiving the conditioned analog input data; and the DAQ device performing analog to digital conversion on the conditioned analog input data to produce the result data.

38. The method of claim 11, wherein the DAQ device comprises one or more of an analog input/output (I/O) board, or a digital input/output (I/O) board.

39. The DAQ system of claim 18, wherein the remote DAQ device includes an input operable to couple to a unit under test or process, wherein the DAQ system is operable to measure signals from the unit under test or process.

40. The DAQ system of claim 18, wherein the remote DAQ device includes an input operable to couple to an external source;

wherein the remote DAQ device is operable to acquire the result data fro m the external source in response to the server DAQ driver software executing the call to perform the DAQ function using the remote DAQ device.

41. The DAQ system of claim 40, wherein the remote DAQ device acquires the result data from a unit under test or process being monitored or measured.

42. The DAQ system of claim 18, wherein the remote DAQ device includes:

an input operable to couple to a unit under test or process for receiving analog, input signals; and analog to digital conversion logic coupled to the input for converting the received analog input signals into digital signals;

wherein, in response to the server DAQ driver software executing the call to perform the DAQ function using the remote DAQ device, the remote DAQ device is operable to:

acquire analog data from the unit under test or process; and perform analog to digital conversion on the analog, data to produce the result data.

43. The DAQ system of claim 42, wherein the DAQ system further includes:

signal conditioning logic coupled to the input of the remote DAQ device for conditioning signals, wherein the signal conditioning logic is operable to couple to the unit under test or process;

wherein the signal conditioning logic is operable to condition the analog input data to produce conditioned analog input data;

wherein the remote DAQ device is operable to receive the conditioned analog input data from the signal conditioning logic.

44. A method for remotely accessing a data acquisition (DAQ) device in a DAQ system, the method comprising:

receiving a request to perform a DAQ function using the DAQ device, wherein the request is received by a client computer system;

wherein the DAQ device is coupled to a server computer system, wherein the server computer system is coupled to the client computer system over a network;

transferring the request to the server computer;

the server computer system executing the request, wherein said executing includes the DAQ device acquiring data from an external source;

the server computer system transferring the acquired data to the client computer system; and the client computer system receiving the acquired data.

45. The method of claim 44, wherein the external source comprises a unit under test or process being monitored or measured.

46. The method of claim 44, wherein the DAQ device acquiring data from the external source comprises:

the DAQ device acquiring analog data from the external source; and the DAQ device performing analog to digital conversion on the analog data to produce the acquired data.

47. The method of claim 44, wherein the DAQ device acquiring data from the external source comprises:

acquiring analog input data from the external source;

conditioning the analog input data to produce conditioned analog input data;

the DAQ device receiving the conditioned analog input data; and the DAQ device performing analog to digital conversion on the conditioned analog input data to produce the acquired data.

48. The method of claim 44, further comprising:

determining that the request to perform the DAQ function is intended to use a remote DAQ device after receiving the request.

49. The method of claim 44, further comprising:

the client computer system performing a measurement function using the acquired data.

* * * * *

UNITED STATES PATENT AND TRADEMARK OFFICE
CERTIFICATE OF CORRECTION

PATENT NO. : 6,243,738 B1
DATED : June 5, 2001
INVENTOR(S) : Hayles et al.

It is certified that error appears in the above-identified patent and that said Letters Patent is hereby corrected as shown below:

Column 21, claim 42,
Line 64, please delete the comma between analog and input.

Column 22, claim 42,
Line 7, please delete the comma after analog.

Signed and Sealed this

Fifteenth Day of January, 2002

Attest:

JAMES E. ROGAN
Attesting Officer
Director of the United States Patent and Trademark Office